United States Patent

Cotter et al.

[11] Patent Number: 5,275,387
[45] Date of Patent: Jan. 4, 1994

[54] GAS SPRING

[75] Inventors: Jonathan P. Cotter, Dearborn; Patrick J. Cotter, Plymouth, both of Mich.

[73] Assignee: Power Components, Inc., Detroit, Mich.

[21] Appl. No.: 865,956

[22] Filed: Apr. 9, 1992

[51] Int. Cl.$^5$ .............................. F16F 9/34; F16F 5/00
[52] U.S. Cl. .................. 267/64.11; 188/322.17; 277/152
[58] Field of Search ............... 267/64.11, 64.22, 64.28, 267/118, 129, 119; 188/322.14, 322.16, 322.17, 322.18, 322.21; 277/152, 153; 137/528, 860

[56] References Cited

U.S. PATENT DOCUMENTS

| | | | |
|---|---|---|---|
| 2,385,045 | 8/1943 | Wallace | 188/322.16 |
| 3,104,916 | 9/1963 | Dowling et al. | 188/322.17 |
| 3,361,422 | 1/1968 | Theuleau | 267/64.11 |
| 3,857,405 | 12/1974 | Heideman | 137/860 |
| 4,045,008 | 8/1977 | Bauer | 267/64.11 |
| 4,093,196 | 6/1978 | Bauer | 267/64.11 |
| 4,257,580 | 3/1981 | Schnitzius | 264/64.28 |
| 4,736,824 | 4/1988 | Dony et al. | 188/322.11 |
| 4,792,128 | 12/1988 | Holley | 267/118 |
| 4,813,655 | 3/1989 | Hennells | 267/64.28 |
| 4,838,527 | 6/1989 | Holley | 267/64.28 |
| 4,987,826 | 1/1991 | Deppert et al. | 188/322.17 |
| 5,011,121 | 4/1991 | Oriola et al. | 267/64.11 |

FOREIGN PATENT DOCUMENTS 3937896 5/1991 Fed. Rep. of Germany ...... 277/152

*Primary Examiner*—Robert J. Oberleitner
*Assistant Examiner*—Chris Schwartz
*Attorney, Agent, or Firm*—Barnes, Kisselle, Raisch, Choate, Whittemore & Hulbert

[57] ABSTRACT

A gas spring with a piston reciprocable in a chamber of a casing, a sealing assembly at the rear end of the casing through which the piston rod extends, and an end cap closing the rear end of the casing. The sealing assembly has a reinforcing ring having a sealing ring on one side and a wiper on the other side. The sealing ring and wiper are portions of a single body of elastomeric material molded to the reinforcing ring and integrally connected through one or more openings in the reinforcing ring. The casing wall is rolled radially inwardly over the sealing assembly into pressure contact with the reinforcing ring so that the sealing assembly becomes in effect an end cap for the front end of the casing. The rear end of the casing is rolled over the rear end cap by swaging into pressure contact with the end cap. A filler valve is disposed in the end cap.

14 Claims, 2 Drawing Sheets

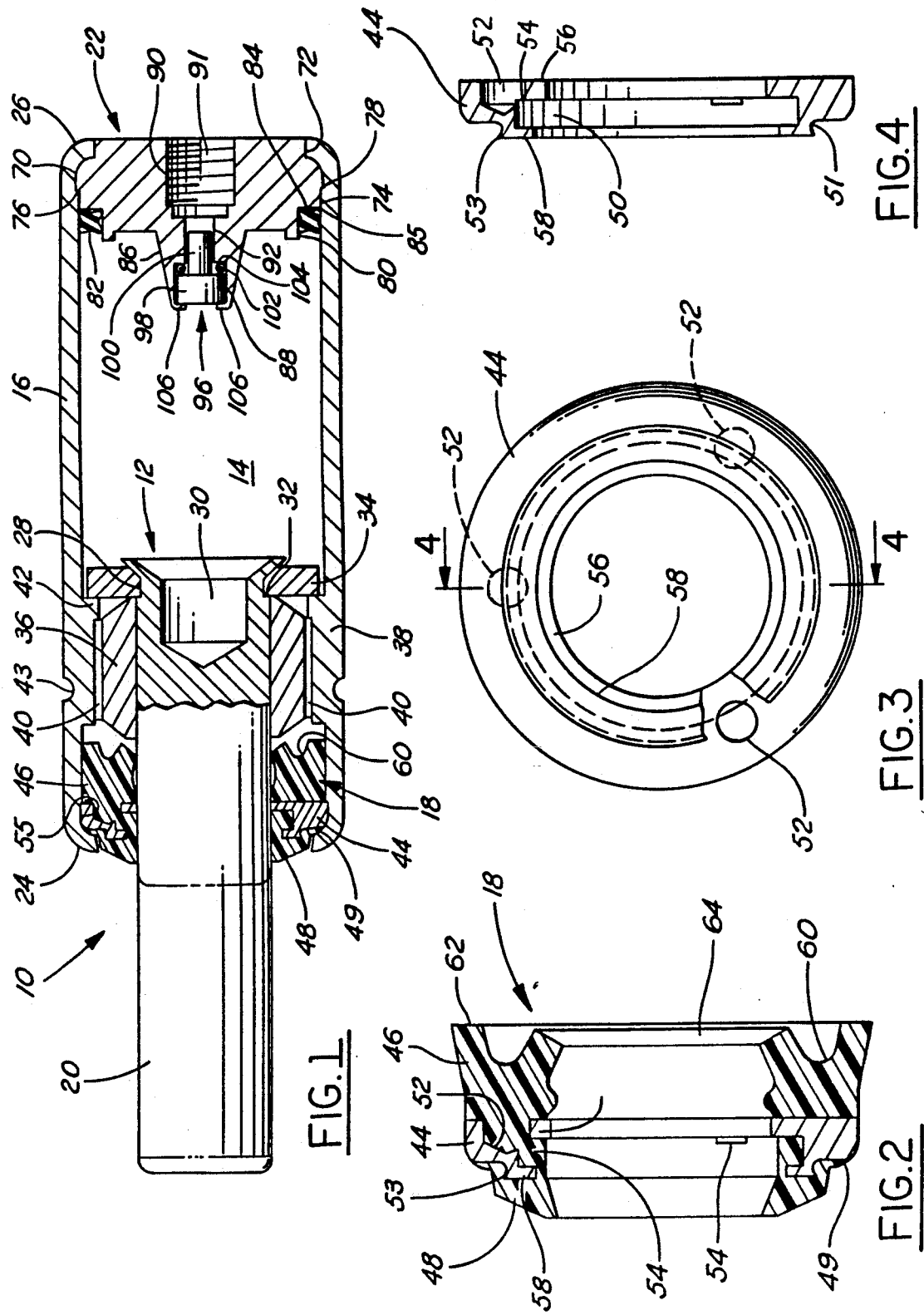

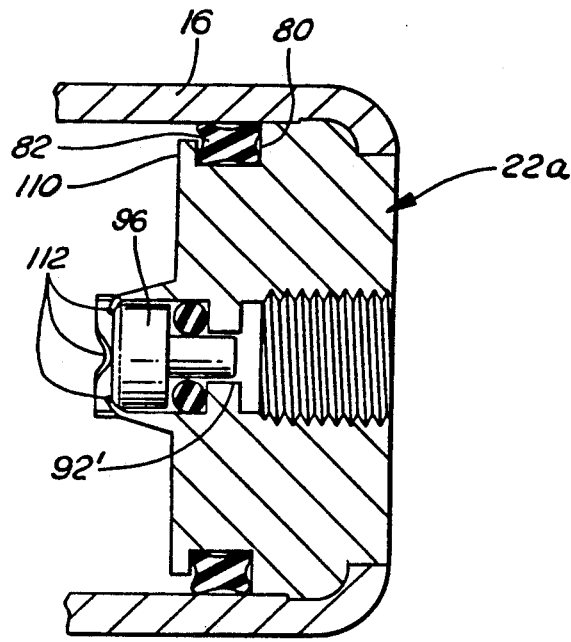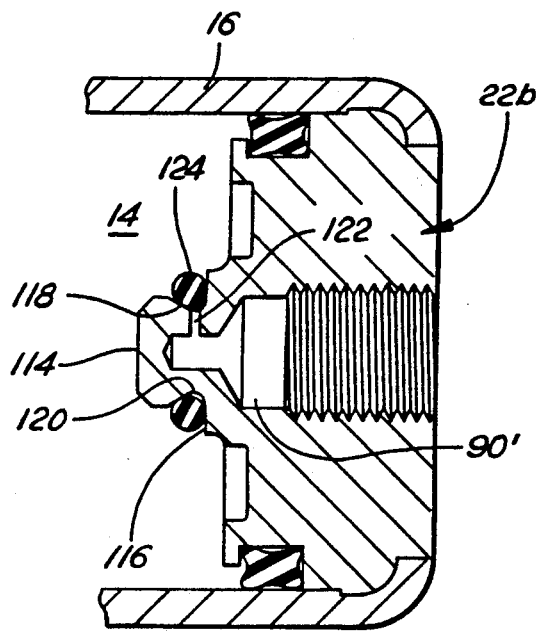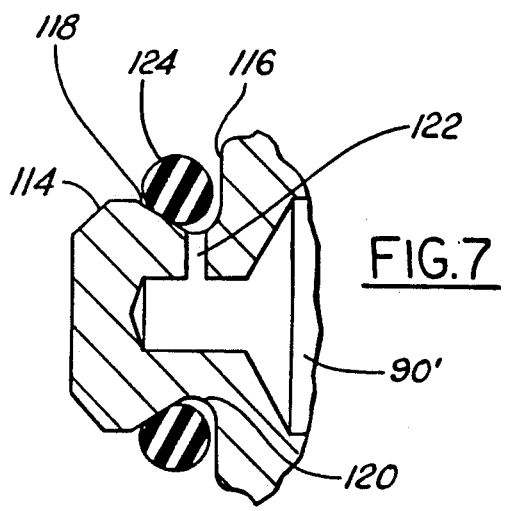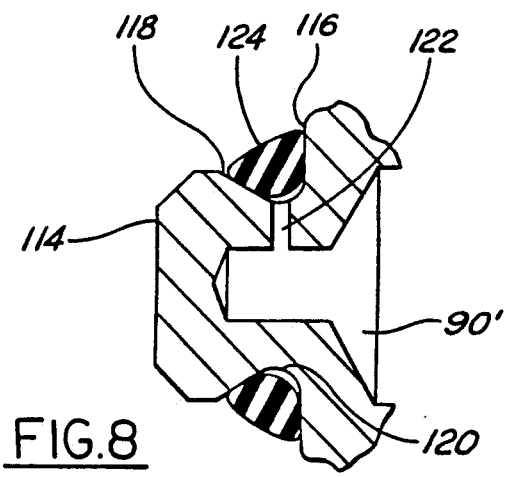

GAS SPRING

This invention relates generally to gas springs, and more particularly to a gas spring having improved sealing characteristics.

BACKGROUND

Gas springs may be employed to yieldably clamp a workpiece while operations are performed thereon. Thus a sheet metal part may be held down by gas springs during stamping or forming. The gas springs can be operated with either an external source of gas or can be precharged and operated as a self-contained unit. Self-contained units may be charged with an inert gas at a pressure of 2000 psi, and in use the pressure may increase to 3000–5000 psi. Examples of such gas springs are shown in U.S. Pat. Nos. 4,792,128 and 4,838,527.

SUMMARY

In accordance with this invention, the gas spring is precharged, replaceable or disposable and has improved seals capable of retaining the gas charge for long periods.

More specifically, the gas spring has a sealing assembly at one end of the casing which seals around the piston rod and is composed of a reinforcing ring having a sealing ring secured to one side thereof and a wiper secured to the other side. The sealing ring and wiper may be portions of a single body of flexible, compressible elastomeric material molded to the reinforcing ring and interconnected through openings in the reinforcing ring. Preferably, the end of the gas spring cylinder or casing is rolled radially inwardly by swaging into pressure contact with the reinforcing ring of the sealing assembly. The reinforcing ring serves not only to reinforce the sealing assembly but also cooperates with the casing in retaining the sealing assembly in the casing. The opposite end of the casing is closed by an end cap, and a sealing ring seals the line of contact between the end cap and casing. This opposite end of the casing is also preferably rolled by swaging over the end cap to virtually eliminate any gap at the line of contact between the end cap and casing and preclude extrusion of the sealing ring at this point.

Objects, features and advantages of the invention are to provide a gas spring which has the foregoing characteristics, a long in-service useful life and is disposable, self-contained, rugged, durable, reliable, of simplified design and of relatively economical manufacture and assembly.

BRIEF DESCRIPTION OF THE DRAWINGS

These and other objects, features and advantages of this invention will be apparent from the following detailed description, appended claims and accompanying drawings in which:

FIG. 1 is a longitudinal sectional view of a gas spring constructed in accordance with the invention.

FIG. 2 is an enlarged sectional view of the reinforcing and sealing ring assembly at the front end of the gas spring.

FIG. 3 is an elevational view of a reinforcing ring which forms a part of the sealing ring assembly.

FIG. 4 is a sectional view taken on the line 4—4 in FIG. 3.

FIG. 5 is a fragmentary sectional view of the rear end portion of a gas spring with a modified filler valve assembly.

FIG. 6 is a fragmentary sectional view of the rear end portion of a gas spring showing another modified filler valve assembly.

FIG. 7 is an enlargement of a portion of FIG. 6, in which the O-ring is shown in the open position during charging of gas into the gas spring.

FIG. 8 is an enlargement of a portion of FIG. 6 showing the O-ring in the sealed position after charging the gas spring.

DETAILED DESCRIPTION

Referring now more particularly to the drawings and especially to FIGS. 1 to 4, the gas spring 10 comprises a piston and rod assembly 12 reciprocable in a chamber 14 of a casing 16, with a sealing assembly 18 at the front end of the casing through which a piston rod 20 extends, and an end cap 22 closing the rear end of the casing. The casing is an elongated, open-ended tubular member with end portions 24 and 26 turned radially inwardly as shown.

The piston rod 20 is an elongated cylindrical member. The inner end portion 28 of the piston rod has a central axially extending clearance socket or recess 30 and is of reduced outside diameter to form an annular shoulder 32. A piston 34 is sleeved on the inner end portion 28 and abuts the shoulder 32. The inner end portion 28 of the rod is flared, preferably by rolling, to clamp the piston 34 against shoulder 32.

The piston 34 is guided for axial reciprocation within the casing chamber 14 by a bearing 36. The bearing is a ring-shaped sleeve and is preferably formed of sintered bronze, impregnated with lubricant and is secured within a thickened portion 38 of the casing near its front end as by a press fit. The radially outer surface of the bearing has a plurality of axially extending grooves 40 to permit gas in the chamber to move freely through the grooves from one end of the bearing to the other when the piston reciprocates. The rear end of the thickened portion provides an annular shoulder 42 which the piston 34 contacts upon forward movement of the piston to limit such forward movement. An annular groove 43 in the outer surface of the casing is useful for the purpose of mounting or anchoring the gas spring. This groove is preferably formed in the thickened portion of the casing so that it will not weaken the casing wall which must withstand the high pressure of gas in the chamber.

The sealing assembly 18 at the forward end of the casing comprises a steel reinforcing ring 44, a sealing ring 46, and a wiper 48. The sealing ring and wiper are preferably portions of an integral body of flexible, compressible elastomeric material, preferably polyurethane.

The reinforcing ring 44 is circular and along its radially inner surface is formed to provide a circular radially inwardly opening annular groove or channel 50 (FIG. 4). A plurality of equally circumferentially spaced blind holes 52 are formed in the back face of the reinforcing ring, opening through the back face only. These blind holes communicate with the groove or channel 50 through a plurality of ports 54, one for each hole, which open radially inwardly into the channel 50 preferably at the juncture between the bottom wall and rear wall of the channel.

The inner diameter of the rear wall 56 of the channel 50 is only slightly larger than the diameter of the piston rod to clear the piston rod as it reciprocates. The front wall 58 of the channel is of a somewhat larger diameter as will be apparent in FIGS. 1, 2 and 4.

A radially outwardly opening annular groove 51 behind the outer extremity of the front face of the reinforcing ring 44 provides an annular shoulder or ledge 53 which assists in retaining the wiper as will become more apparent hereinafter.

The outside diameter of the reinforcing ring 44 is complimentary with the inside diameter of a shallow shoulder 55 in the casing. Preferably the front end portion 24 of the casing 16 is rolled radially inwardly over the reinforcing ring by swaging it into pressure contact with the reinforcing ring throughout a full 360° circumference. The reinforcing ring 44 not only reinforces the sealing assembly 18 but also serves as a retainer to retain the sealing assembly within the casing against forward displacement due to the pressure of gas in the chamber. The sealing assembly becomes in effect an end cap for the casing.

The rear wall of the sealing ring 46 preferably has an inside diameter somewhat less than the diameter of the piston rod 20 and an outside diameter somewhat greater than the inside diameter of the casing 16 so that it will fit snugly within the casing and provide a seal around the piston rod. Preferably the rear wall of the sealing ring 46 has an annular groove or recess 60 so that the pressure of gas in the chamber 14 will force the rear lips 62 and 64 of the sealing ring both outwardly into firm sealing engagement with the inner wall of the casing and inwardly into firm sealing engagement with the piston rod 20.

The front of the seal has a scraper or wiper 48 which is ring-shaped and of the cross-section shown, and with a minimum inside diameter somewhat less than the outside diameter of the piston rod 20 in order to be compressed thereagainst and prevent the entry of dirt or other foreign matter into the chamber 14 of the gas spring. The wiper 48 has an outer portion 49 clamped between and making sealing contact with the reinforcing ring 44 and the front end portion 24 of the casing.

The sealing assembly 18 is preferably formed by molding elastomeric material around the reinforcing ring through the blind holes 52, ports 54 and channel 50 and on both sides of the ring to form the sealing ring 46 and the wiper 48. The sealing ring and wiper are integrally connected by molding material in the blind holes, ports and channel and the wiper 48 is retained by the channel 50 and in assembly by the overlaping casing end portion 24. During axial reciprocation of the piston rod 20 in chamber 14, the elastomeric material of the wiper 48 is subjected to a reversal of forces due to frictional drag.

Because of the high temperatures (150° F.), pressures (2000–5000 psi), and pressure fluctuations in use there is a decided tendency for the elastomeric material to extrude through the blind holes 52, ports 54 and channel 50 from one side of the reinforcing ring 44 to the other, eventually destroying the seal. This is resisted and essentially prevented, however, due to the fact that the openings through reinforcing ring 44 do not provide a direct axial passage. Any flow of elastomeric material would have to pass into the blind holes, and then through the substantially radial ports 54 and through the groove or channel 50 and axially around the wall 58. Also, the ledge 53 over which the wiper 48 is molded serves as a lock for the wiper and prevents it from becoming dislodged as a result of piston rod drag. Hence, the sealing assembly 18 remains intact throughout long periods of use in service. The seal assembly also retains the lubricant in the chamber since it is downstream or forward of the bearing 36.

The radially outer surface of the end cap 22 for the back end of the gas spring has a central portion 70 which curves radially inwardly in a rearward direction and joins a cylindrical rear portion 72. The central portion 70 is separated from a front portion 74 of reduced diameter by an annular shoulder 76. The shoulder 76 abuts an annular shoulder 78 on the inner wall of the casing. The front face of the end cap has an annular recess 80 along its outer edge which receives a sealing ring 82 of generally X-shaped cross-section, commonly referred to as a quad ring. This quad ring 82 seals at all four edges including the juncture or line of contact 85 between the bottom wall 84 of the recess and the inner wall of the casing.

Preferably the rear end portion 26 of the casing 16 is rolled radially inwardly by swaging over the curved central portion 70 of the outer surface of the end cap into pressure contact therewith throughout a full 360° circumference. As a result, any gap between the end cap and casing at the line of contact 85 is virtually eliminated, whereby the quad ring 82 will not be damaged or extruded through at this point by the pressure of gas in the chamber.

The end cap has a central projection 86 forming a valve housing 88 extending rearwardly into the casing chamber. The projection 86 is aligned with and smaller in diameter than the recess or socket 30 in the piston in order to permit a full stroke of the piston without interference. An axially extending fill passage 90 extends through the end cap, having an enlarged threaded rear portion 91 opening through the rear wall for attachment to a source of gas under pressure, and a narrower intermediate portion 92 extending forwardly therefrom into the valve housing counterbore 88 which is of somewhat larger diameter than the intermediate portion and opens into the chamber 14. The threaded portion of the passage may also be used to attach the gas spring to a support, thereby serving as an anchor for the gas spring.

A rivet type valve 96 with a head 98 and a shank 100 is slidably received in the housing 88. The head 98 is of smaller diameter than the inner wall of the housing 88, but larger than the intermediate portion 92 of the passage. The shank 100 is of smaller diameter than the head and the intermediate portion 92 of the passage. An O-ring seal 102 surrounding the shank is provided between the head 98 of the valve and the shoulder 104 of the valve housing. The front end of the wall of the projection 86 forming housing 88 has circumferentially spaced tabs 106 bent radially inwardly to confine the valve 96 in the housing. When charging the chamber, the valve 96 is shifted forwardly away from the shoulder 104 and against tabs 106 and gas flows along the sides of the valve shank and around the valve head. When charged, the pressure of gas in the chamber shifts the valve rearwardly so that the valve head seals against the O-ring and closes the charging passage. The charged chamber 14 can be relieved by manually displacing the head 96 so that gas blows out through the passage 90 to the atmosphere. The head is displaced by engaging the end of the shank 100 with a rod, screw driver, or the like and pushing the head inward.

To assemble the gas spring, and before the ends of the casing are turned radially inwardly, the sealing assembly 18 may be positioned within the front end of the casing and the front end portion 24 rolled as by swaging to the position in FIG. 1 into pressure contact with the reinforcing ring of the sealing assembly to retain the sealing assembly in the rear end of the casing. The bearing 36 is installed with a press fit within the casing either before or after the sealing assembly. The piston and piston rod are then inserted through the rear end of the casing and thereafter the end cap 22 is inserted through the back end of the casing with its shoulder 76 in contact with the casing shoulder 78 and the rear end portion 26 of the casing is swaged over the end cap to the position shown in FIG. 1. This completes the assembly of the gas spring.

FIG. 5 shows a modification in which the end cap 22a has a flange 110 extending radially outwardly part way across the recess 80 to partially confine the quad ring 82. FIG. 5 differs further from the construction previously described in that the wall of the projection defining the valve housing 88 is staked radially inwardly at a plurality of circumferentially spaced points to provide tabs 112 overlapping the head of the valve 96 to retain it in the housing. The intermediate passage 92' is somewhat shorter than the one previously described. Otherwise the FIG. 5 construction is essentially the same as the one previously described.

FIGS. 6-8 show a further modification in which the end cap 22b has a central knob or head 114 projecting into the chamber 14 from a radially extending front surface 116 of the end cap. This front surface and a tapered annular wall 118 of the head form a generally V-shaped annular recess or groove 120 behind the head. The fill passage 90' extending axially through the end cap dead ends in the head and opens into the chamber 14 through a lateral port 122 at the bottom of the V-shaped recess or groove 120. An O-ring 124 is disposed in the groove 120 and in its natural free state condition is of smaller inside diameter than the head 114. Preferably the O-ring is small enough to be slightly stretched when engaging both of the surfaces 116 and 118 of the groove when received therein to provide a seal at a relatively low pressure. The O-ring provides a resiliently biased sealing member valve. When the chamber is charged, gas entering the passage flows through the port 122 and, as shown in FIG. 7, expands the O-ring enough to open the port and allow gas to enter the chamber. After the chamber has been charged with gas, the pressure of gas in the chamber presses the O-ring down into the recess or neck as shown in FIG. 8, closing the port and sealing the chamber.

Preferably the O-ring and groove 120 are sized so that as shown in FIG. 8 when the chamber 14 is pressurized the O-ring does not bottom out in the root or base of the groove. The diameter of the head 114 is also large enough to retain the O-ring in the groove during rapid filling of the chamber 14 with pressurized gas. To prevent damage to the O-ring the port 122 should be of relatively small diameter preferably about 0.015 of an inch. The side walls 116 and 118 are inclined to each other at an acute included angle of about 40° to 80° and preferably about 45° to 60°, and the radius of the base at the groove 120 is about ¼ to ¾ and preferable about ½ of the radius of the O-ring. Preferably the O-ring has a durometer of 70.

The construction of FIG. 6-8 has the advantage of simplicity of manufacture and assembly. It has no moving parts, is designed to be filled one time only, and cannot be tampered with from outside the pressure vessel.

What is claimed is:

1. A gas spring comprising an elongated tubular casing having a chamber therein for containing gas under pressure and an annular wall defining an opening at one end of said casing, an axially reciprocable piston in said chamber having a rod projecting from said chamber through said opening, and a sealing assembly at said one end of said casing providing a seal between said annular wall and said rod, said sealing assembly comprising a reinforcing ring encircling said rod in supporting relationship to said annular wall, a sealing ring of flexible, compressible material secured to one side of said reinforcing ring and having sealing contact with said annular wall and with said rod, a wiper of flexible, compressible material secured to the opposite side of said reinforcing ring, encircling said rod and having wiping contact with said rod, said reinforcing ring having passage means therethrough, said sealing ring and said wiper are portions of a single body of elastomeric material integrally connected through said passage means, and at least one segment of said passage means extending non-axially to thereby resist extrusion of elastomeric material through said passage means as said piston moves axially in said chamber.

2. A gas spring as defined in claim 1, wherein said annular wall is swaged into pressure contact with said reinforcing ring.

3. A gas spring as defined in claim 2, wherein said annular wall has a terminal portion extending axially outwardly beyond the point of pressure contact with said reinforcing ring, said terminal portion being rolled radially inwardly to confine and retain said reinforcing ring.

4. A gas spring as defied in claim 3, wherein said wiper has sealing contact with said terminal portion of said annular wall.

5. A gas spring as defined in claim 1 wherein said annular wall defines a second opening at the opposite end of said casing, an end cap fitted within said annular wall to close said second opening, said end cap having a fill passage therein for charging said chamber with gas, said end cap having a tubular valve housing projecting axially into said chamber and terminating in an open inner end, said housing defining a portion of said fill passage and having an annular seal therein, an annular seal of an elastomeric material with a central through hole received in said housing and engagable with said seat so that gas can flow through said central hole into said chamber, a valve having a head loosely fitted and axially movable in said housing, a generally radially extending and circumferentially continuous shoulder engagable with said seal and an integral shank extending into said central hole through said seal in said housing, said head being subject to pressure of gas in said chamber to engage said shoulder with said seal and close said fill passage and when subject to the inflow of charging gas to disengage said shoulder from said seal and open said fill passage, said housing having inwardly turned tabs across said open end to retain said valve therein.

6. A gas spring as defined in claim 5, wherein said tabs are integrally formed on said inner end of said housing.

7. A gas spring as defined in claim 5, wherein said tabs are formed by bending circumferentially spaced portions of said inner end of said housing radially inwardly.

8. A gas spring as defined in claim 1 wherein said annular wall of said casing defines another opening at the opposite end of said casing, an end cap received in said another opening and fitted within and engaging said annular wall along a circumferentially continuous line of contact to close said another opening, a sealing ring in said chamber in circumferentially continuous sealing contact with said annular wall and with said end cap, and said annular wall being swaged into pressure contact with said end cap along said line of contact to prevent said sealing ring from extruding between said annular wall and said end cap at said line of contact.

9. A gas spring as defined in claim 8, wherein said annular wall has a terminal portion extending axially beyond said line of contact and generally radially inwardly to confine and retain said end cap.

10. A gas spring as defined in claim 8, wherein said sealing ring is a quad ring.

11. A gas spring as defined in claim 1, wherein said passage means comprises a radially inwardly opening annular groove in said reinforcing ring, a plurality of circumferentially spaced axially extending blind holes adjacent said groove opening through one side only of said reinforcing ring, and a port leading from each said hole into a radially outer portion of said groove.

12. A gas spring as defined in claim 11, wherein said annular wall is swaged into pressure contact with said reinforcing rig, said annular wall has a terminal portion extending axially beyond the point of pressure contact with said reinforcing ring, said terminal portion is rolled radially inwardly to confine said reinforcing ring and overlap the periphery of said wiper.

13. A gas spring comprising an elongated tubular casing having a chamber therein for containing a gas under pressure and a first opening at one end of said casing, an axially reciprocable piston in said chamber having a rod projecting from said chamber said casing having an annular wall defining a second opening at the opposite end of said casing, an end cap fitted within said annular wall to close said second opening, said end cap having a fill passage therein for charging said chamber with gas, a head projecting axially from said end cap into said chamber, a generally V-shaped groove of reduced cross-section relative to said head and disposed between the free end of said head and said end cap, said fill passage opening to said chamber through a port in said groove, an O-ring encircling and received in said groove, said V-shaped groove having a pair of spaced apart walls inclined to each other at an acute included angle in the range of 40° to 80° and a root blending into said walls with a radius of $\frac{1}{4}$ to $\frac{3}{4}$ of the radius of said O-ring, said O-ring having an inside diameter smaller than the diameter of said head, and said O-ring being subject to pressure of gas in said chamber to close said port from said chamber and when subject to the pressure of inflow of charging gas to open said port to said chamber.

14. A gas spring as defined in claim 1, wherein said passage means comprises a generally radially inwardly opening recess in said reinforcing ring, at least one axially extending blind hole adjacent said recess opening through one side only of said reinforcing ring, and a port from said hole opening into a radially outer portion of said recess.

* * * * *